(12) United States Patent
Morimoto

(10) Patent No.: US 12,332,923 B2
(45) Date of Patent: Jun. 17, 2025

(54) CASE SEARCH METHOD AND CASE SEARCH SYSTEM

(71) Applicant: Shimadzu Corporation, Kyoto (JP)

(72) Inventor: Kentaro Morimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 433 days.

(21) Appl. No.: 17/285,804

(22) PCT Filed: Oct. 15, 2019

(86) PCT No.: PCT/JP2019/040537
§ 371 (c)(1),
(2) Date: Oct. 25, 2021

(87) PCT Pub. No.: WO2020/080376
PCT Pub. Date: Apr. 23, 2020

(65) Prior Publication Data
US 2022/0035846 A1    Feb. 3, 2022

Related U.S. Application Data

(63) Continuation-in-part of application No. PCT/JP2018/038473, filed on Oct. 16, 2018.

(51) Int. Cl.
*G06F 16/332*    (2025.01)
*G06F 16/335*    (2019.01)
(Continued)

(52) U.S. Cl.
CPC .......... *G06F 16/332* (2019.01); *G06F 16/335* (2019.01); *G06F 40/268* (2020.01); *G06F 40/30* (2020.01)

(58) Field of Classification Search
CPC .... G06F 16/332; G06F 16/335; G06F 40/268; G06F 40/30; G06F 16/3347;
(Continued)

(56) References Cited

U.S. PATENT DOCUMENTS 9,235,806 B2    1/2016  Sweeney et al.
2002/0004786 A1  1/2002  Tagawa et al.
(Continued)

FOREIGN PATENT DOCUMENTS

AU    2004213986 A1    9/2004
AU    2008292781 A1    3/2009
(Continued)

OTHER PUBLICATIONS

Decision of Refusal for corresponding Japanese patent application No. JP 2020-553210, dated Sep. 6, 2022.
(Continued)

*Primary Examiner* — Maher N Algibhah
(74) *Attorney, Agent, or Firm* — Muir Patent Law, PLLC

(57) ABSTRACT

In order to provide a case search method and a case search system for providing a case of an analysis device, preprocessing, etc., associated with a sample that a user, etc., wishes to analyze, with respect to an analysis case for a presented case, a search unit 29 interprets the semantic content contained in a search string input by a user, and retrieves, based on the interpretation result, an analysis case relating to a sample which coincides with or is similar to the presented sample, out of analysis cases stored in advance in databases A, B, and outputs the retrieved case.

17 Claims, 5 Drawing Sheets

(51) Int. Cl.
*G06F 40/268* (2020.01)
*G06F 40/30* (2020.01)

(58) Field of Classification Search
CPC .. G06F 16/3344; G06F 40/211; G06F 40/284; G06F 40/289
See application file for complete search history.

(56) References Cited

U.S. PATENT DOCUMENTS

| | | |
|---|---|---|
| 2004/0243390 A1 | 12/2004 | Pinkham |
| 2004/0260679 A1 | 12/2004 | Best et al. |
| 2005/0108001 A1 | 5/2005 | Aarskog et al. |
| 2007/0271247 A1 | 11/2007 | Best et al. |
| 2007/0288503 A1 | 12/2007 | Taylor |
| 2011/0259129 A1* | 10/2011 | Murata ............ G01N 35/00693 73/866.3 |
| 2014/0040275 A1* | 2/2014 | Dang ................. G06F 16/2228 707/741 |
| 2014/0303957 A1 | 10/2014 | Lee et al. |
| 2015/0127634 A1* | 5/2015 | Hong .................... G06F 16/332 707/722 |
| 2015/0363384 A1 | 12/2015 | Williams et al. |
| 2016/0048936 A1 | 2/2016 | Perkowski et al. |
| 2016/0085853 A1 | 3/2016 | Zelevinsky et al. |
| 2017/0075877 A1 | 3/2017 | Lepeltier |
| 2017/0177712 A1* | 6/2017 | Kopru ................. G06F 16/3337 |
| 2018/0075017 A1 | 3/2018 | Takase et al. |
| 2018/0233344 A1 | 8/2018 | Oka et al. |
| 2019/0251455 A1* | 8/2019 | Spangler ................ G06N 20/00 |
| 2020/0012789 A1 | 1/2020 | Usui et al. |

FOREIGN PATENT DOCUMENTS

| | | | |
|---|---|---|---|
| CA | 2914398 A1 | | 3/2009 |
| JP | 1999045254 | | 2/1999 |
| JP | 2002083223 A | | 3/2002 |
| JP | 2002257757 A | | 9/2002 |
| JP | 2002259445 A | | 9/2002 |
| JP | 2003115010 A | | 4/2003 |
| JP | 2003173340 A | * | 6/2003 |
| JP | 2004295396 A | | 10/2004 |
| JP | 2006146621 A | * | 6/2006 |
| JP | 2006331245 A | | 12/2006 |
| JP | 2011103075 A | | 5/2011 |
| JP | 2011175306 A | | 9/2011 |
| JP | 2012059182 A | | 3/2012 |
| JP | 2013020439 A | | 1/2013 |
| JP | 2017004260 A | | 1/2017 |
| JP | 2017528842 A | | 9/2017 |
| JP | 2017201478 A | | 11/2017 |
| JP | 2018010482 A | | 1/2018 |
| JP | 2018132347 A | | 8/2018 |

OTHER PUBLICATIONS

Zhou et al., "Supervised Approaches for Japanese Wikification," 2017, Information Processing Society of Japan.

* cited by examiner

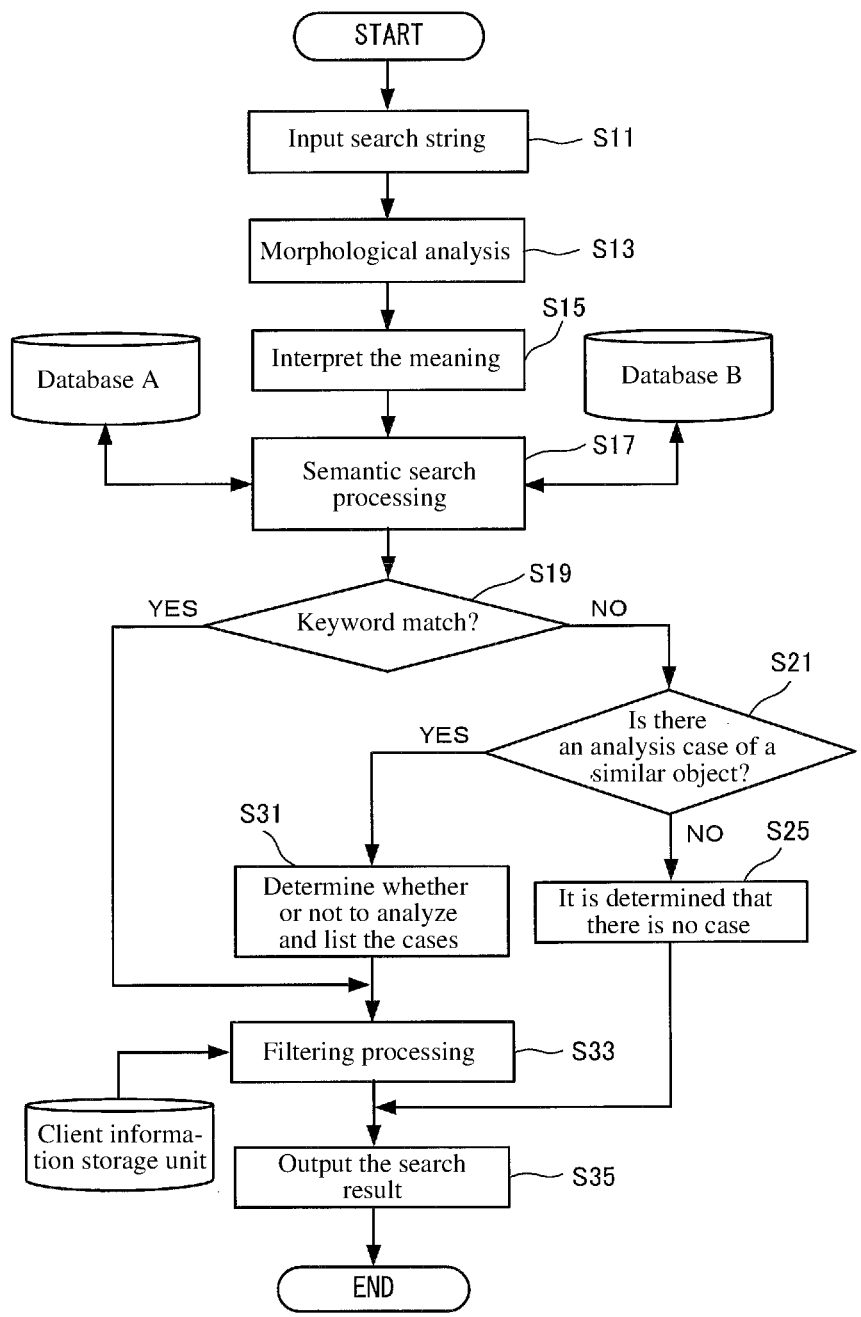

CASE SEARCH METHOD AND CASE SEARCH SYSTEM

TECHNICAL FIELD

The present invention relates to a case search method and a case search system for acquiring, for example, a case relating to a sample analysis via a network.

BACKGROUND ART

When responding to an inquiry from a customer before and after a sale of a product to the customer, the sales department and the agency usually serve as a contact point. However, in today's increasingly complication, diversity, and specialization of products, specialized knowledge in specific fields is required, which may put limitations on responses by sales departments and agencies.

For example, when manufacturing and selling an analysis device, such as, e.g., a liquid chromatograph or a mass spectrometer, since analysis device models and measurable samples range widely from life sciences to industries, agricultural industries, and so on, the preprocessing, the actual analysis, and the interpretation of results are difficult except for a person specializing the device. A customer considering a purchase of an analysis device usually has a sample to be measured with the device and is seeking a specific device, preprocessing, measurement method, etc., that can measure the sample.

On the other hand, with the progress of communication technologies in recent years, it has become possible to acquire various information easily via a communication network, such as, e.g., the Internet. Such information can be usually acquired by performing a search according to predetermined procedures using a computer, various terminal devices, or the like.

For example, Patent Document 1 discloses an explanation support system for explaining a product, etc., to be provided to a customer. In the system, the information on the product knowledge acquired by an explainer explaining the product, etc., is recorded and managed in a knowledge information database for each explainer explaining the product, etc. When there is an inquiry from a visitor, an explainer suitable for the explanation of the requested product is extracted. The terminal of the extracted explainer and the terminal used by the customer are connected in a mutually communicable manner via a communication network. In this way, the product, etc., to be provided to the visitor is explained.

Further, Patent document 2 discloses a medical device sales system. This system provides information to a specified user, such as, e.g., a medical professional including a doctor and a nurse, from the manufacturer, the dealer, the agent, etc., via the Internet, e-mail, etc., with respect to the technique for performing information retrieval related to a medicine, a medical device, or the like.

PRIOR ART DOCUMENT

Patent Document

Patent document 1: Japanese Unexamined Patent Application Publication No. 2003-115010
Patent document 2: Japanese Unexamined Patent Application Publication No. 2002-83223

SUMMARY OF THE INVENTION

Problems to be Solved by the Invention

Conventional procedures from a request by a customer wishing to analyze a sample to the receiving order of an analysis device are as follows:
(1) Requesting an analysis, a quotation, etc., by a customer by accessing a distributor, a sales office, a call center, and the like
(2) Answering the analysis request to the device application personnel and hearing with the customer
(3) Proposing an analysis method by the device application personnel
(4) Receiving the order of the device However, it takes a long time until the request by the customer comes down to the person in charge of the device, and there is a problem that the quick response to the request cannot be performed.

Further, regarding the analysis device or the like, sales representatives of distributors and manufacturers are usually familiar with the equipment lineup, but they do not have knowledge of the specific analytical contents.

In a generic information search system, by entering a search term (keyword) that best describes what the searcher wants to find, the search processing (matching processing with the index word) for the database is executed, and a search target that coincides with the specified condition is output as a search result.

On the other hand, in a service, such as, e.g., the search engine provided by Google (registered trademark), it does not provide information about which device should be used to measure the sample of the customer by what preprocessing. The above-described keyword search gives a user only a higher rating for the relevance in such a service.

Therefore, in a conventional information search system, in a case where the input keyword is only a sample name, the input keyword is not an appropriate search keyword when the customer wants to know the measurement method, etc. Therefore, a contact point is necessary for the customer to consult with the device maker about what kind of analysis device should be used.

In the explanation support system described in Patent Document 1, the explainer having the product knowledge and the inquiring customer do not meet face-to-face, but merely face each other via a communication network. This is the same as conventional customer support in a sales department or an agency.

The medical device sales system of Patent Document 2 also has a configuration in which a system on the maker side that sells medical devices and a user system on the hospital side that is a purchaser of medical devices are connected via a wide area network (the Internet). However, the system retrieves a product file with the input keyword, generates the product information corresponding to the keyword, and provides the product information to the member user. Therefore, it is not possible to conduct a search that exceeds the keyword match/mismatch. For example, in a case where the product information is a compound name, there is a problem that even if the keyword coincides with the compound name, the analysis method cannot be retrieved.

The present invention has been made in view of the above-described problems. An object of the present invention is to provide an analysis device corresponding to a sample that a user, etc., wants to analyze, and a case search method and a case search system for providing a case of the preprocessing, etc.

Means for Solving the Problem

As one means for solving the above-described object, the present invention relates to a case search method for retrieving an analysis case relating to a sample presented by a user. The method includes the steps of:

receiving a search string input by the user;

interpreting a semantic content contained in the search string, with respect to an analysis case of the presented sample;

retrieving an analysis case relating to a sample that coincides with or is similar to the presented sample, out of analysis cases stored in advance in a storage unit, based on a result of the interpretation; and outputting the retrieved analysis case.

Further, as one means for solving the above-described problems, the present invention relates to a case search system for retrieving an analysis case of a sample presented by a user. The system includes:

a database configured to accumulate the analysis case;

a reception unit configured to receive a search string input by the user;

an interpretation unit configured to interpret a semantic content contained in the received search string with respect to an analysis case of the presented sample;

a search unit configured to retrieve, based on the result of the interpretation, an analysis case relating to a sample that coincides with or is similar to the presented sample, out of analysis cases stored in the database; and an output unit configured to output the retrieved analysis case.

Further, as one means for solving the above-described problems, the present invention relates to a case search method for retrieving an analysis case relating to a sample presented by a user. The method includes the steps of:

receiving a search string input by the user;

interpreting a semantic content contained in the search string with respect to an analysis case of the presented sample;

retrieving an analysis case relating to a sample that coincides with or is similar to the presented sample, out of analysis cases stored in advance in a storage unit, based on a result of the interpretation;

performing predetermined filtering processing corresponding to customer information acquired in advance with respect to the retrieved analysis case; and outputting an analysis case after the filtering processing.

Effects of the Invention

According to the present invention, even in cases where the input search string does not completely coincide with an analysis case in a database, it is possible to determine whether or not the analysis can be performed by a similar analysis case and answer as an analysis case. Further, it is also possible to answer an analysis result according to an analysis device of a customer, a past analysis case, etc.

BRIEF DESCRIPTION OF THE DRAWINGS

FIG. 6 is a flowchart showing processing procedures for acquiring a required case using the case search system according to the second embodiment.

EMBODIMENTS FOR CARRYING OUT THE INVENTION

Hereinafter, some embodiments will be described in detail with reference to the attached figures.

First Embodiment

Figure 1:
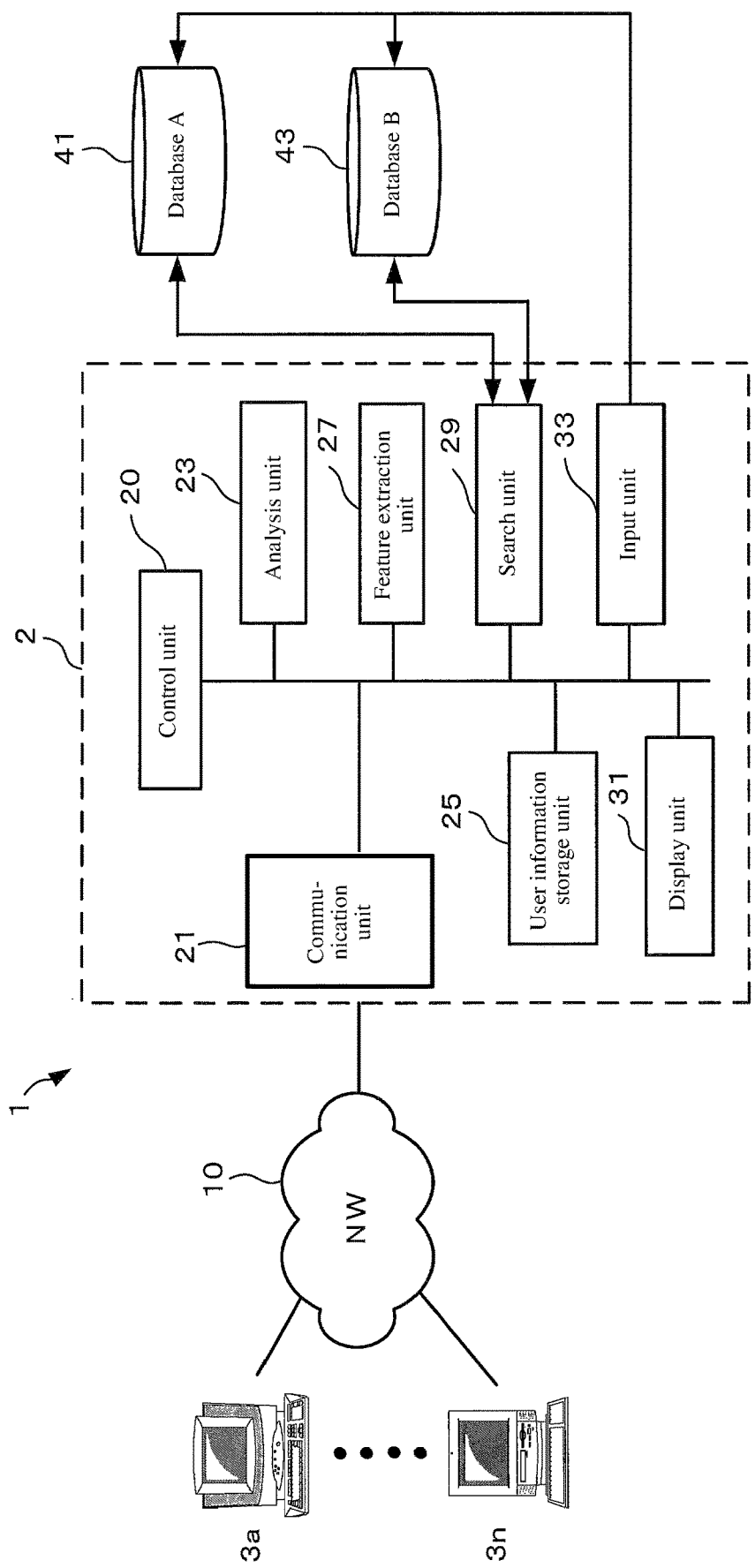
FIG. 1 is a block diagram showing an example of a configuration of a case search system according to a first embodiment.

FIG. 1 is a block diagram showing an exemplary configuration of a case search system according to a first embodiment. The case search system 1 shown in FIG. 1 is a system in which the device manufacturer becomes an information provider in the Internet environment and provides case information in response to a request from an information searcher (user).

The case search system 1 shown in FIG. 1 has a configuration in which a server device 2 installed by a device manufacturer and a plurality of user terminals 3*a* to 3*n* are connected to each other via a network (NW) 10 so as to be able to transmit and receive information to and from each other. The server device 2 performs processing for providing an analysis device corresponding to a sample, preprocessing, an interpretation method of a result, and an analysis case with respect to the analysis of a sample provided by a user.

The user terminals 3*a* to 3*n* constituting the search system 1 are information terminals having a communication function, such as, e.g., but not limited to, a desktop type personal computer (PC), a notebook type PC, a portable terminal (a tablet terminal, a smartphone), and the like.

The server device 2 includes a control unit 20, a communication unit (communication interface) 21, an analysis unit 23, a feature extraction unit 27, a search unit 29, a user information storage unit 25, and a display unit 31. The control unit 20 controls and manages the entire search system. The communication unit (communication interface) 21 performs the connection control and communication control with respect to the network (NW) 10. The analysis unit 23 analyzes the input information from a user. The user information storage unit 25 stores information about registered users. The display unit 31 displays a search result, etc. The server device 2 includes an input unit 33 for inputting various types of data.

The display unit 31 is a display device, such as, e.g., a liquid crystal display. The input unit 33 is configured by an input device, such as, e.g., a keyboard and a mouse. A search string is input using an input screen displayed on the display unit 31.

Further connected to the server device 2 are a database A (41) in which a large number of cases (e.g., an analysis device, pretreatment, an analysis relevant article, an analysis relevant patent document, etc.) as search targets are stored and a database B (43) in which analysis case reports are stored.

The analysis case report here includes an analysis report. The analysis report is a report of an analysis case, such as "pesticide residues of the sample AA were analyzed using the equipment ○○," and other analysis results. An application news and an application note are also included in the analysis report. It may be configured such that the cases in the database A (41) are publicly accessible analysis cases and the analysis case reports in the database B (43) are confidential cases due to the inclusion of non-disclosable data and can be accessed only by specified users.

To the analysis unit 23, a search string (search keyword) representing a search target by a natural language, such as, e.g., letters and sentences, is input from the user terminals 3a to 3n via the network (NW) 10. The analysis unit 23 performs a morphological analysis on the input search keyword based on the predefined search dictionary and divides the keyword into words of the minimum unit. A vector (a word vector or a feature vector) characterizing the search keyword is calculated. The feature extraction unit 27 receives the result of the morphological analysis and extracts the feature of the search keyword.

The search unit 29 retrieves a case (document data) stored in the database, based on the feature of the search keyword acquired from the feature extraction unit 27. The search target is an application note, a patent document, a paper, or the like collecting analysis cases and the like. However, the search service provided by the search unit 29 does not perform a keyword search that retrieves a report that coincides with the search keyword but executes a semantic search that interprets the contents of an analysis case to be examined from the search keyword.

Next, the search processing in the case search system of this embodiment, that is, the processing for acquiring a required case using the case search system by a user, will be described.

Figure 2:
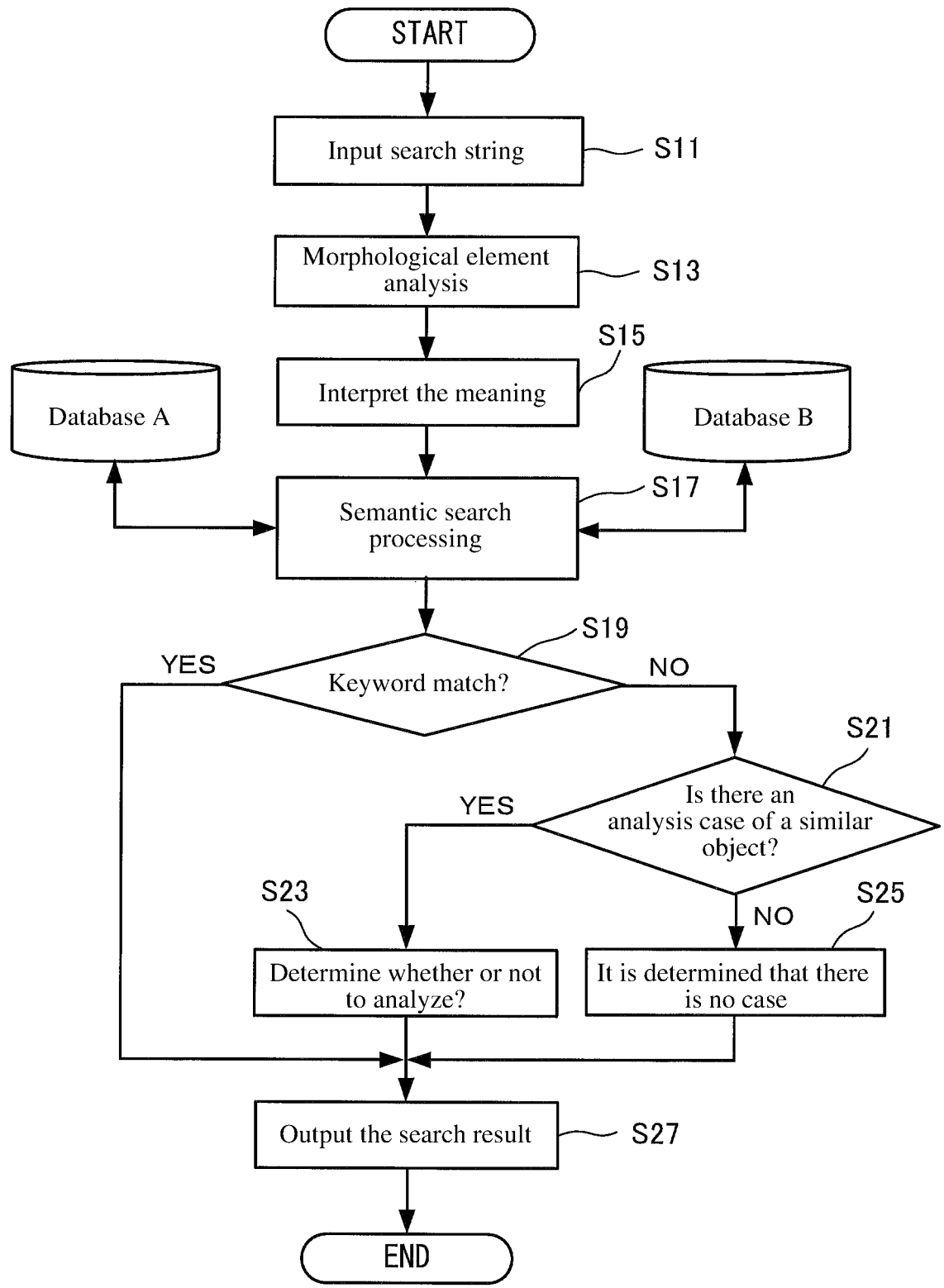
FIG. 2 is a flowchart showing processing procedures for acquiring a required case using the case search system according to the first embodiment.
Figure 3:
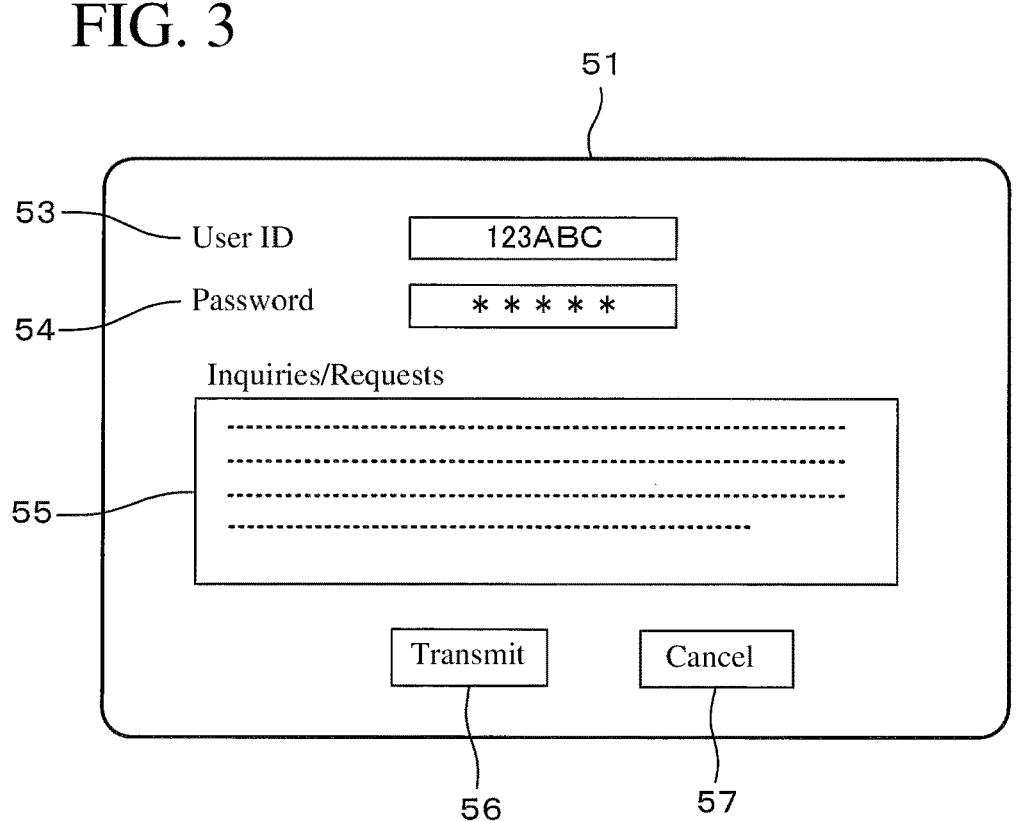
FIG. 3 is a diagram illustrating an example of a login screen at a user terminal.

FIG. 2 is a flowchart showing the processing procedures for acquiring a required case using the case search system. In Step S11 of FIG. 2, the user inputs a search string (search keyword) from a user terminal (e.g., the user terminal 3a) that has been made to show the initial screen display (login screen). FIG. 3 is an exemplary login screen. In the login screen 51, it prompts the user to input a member (user) ID 53, such as, e.g., a registration number, etc., indicating the usage right or the authorization state of the search system 1, and a password 54.

Thereafter, the user inputs a search string, such as, e.g., "I would like to know about the analysis method, the preprocessing, and the analysis device of the sample called ΔΔ" and "I would like to identify and quantify the type of impurities in the tap water" in the entry field 55 as the search request matter and the inquiry content about the analysis, etc., of the sample. Then, by pressing the transmit button 56, the search request is transmitted to the server device 2. The cancel button 57 for canceling the search request is also provided.

In Step S13, the search keyword is divided by the morphological analysis into morphemes (word vectors) of the smallest unit. That is, a morphological analysis is performed on the input search keyword based on the predefined search dictionary to divide into word units. Then, a vector (a word vector or a feature vector) characterizing the search keyword is calculated.

In Step S15, receiving the result of the morphological analysis, the semantic content corresponding to the relationship with the search target is interpreted as the feature of the search keyword from the search keyword syntax, etc. Here, for example, the meaning of the search content of the sample provided from the customer (user) is interpreted. Then, in the subsequent Step S17, semantic search processing is performed to retrieve document data, such as, e.g., an analysis report in the databases A and B.

A semantic search is a technique for identifying a search target that coincides with a search string, based on the semantic representation of the input search string, the intent to search, the object, etc. That is, instead of treating the search string as a simple letter string, it is a technique for interpreting the search string, not as a mere string, but as a meaningful string having a meaning including the search request. In the semantic search, synonyms and similar words are recognized by natural language processing, the structured data is interpreted, so that the analysis method, the analysis device, etc., are presented from the corresponding analysis case.

Natural language processing (NLP: Natural Language Processing) is a series of techniques that allows a computer to process a natural language that people use on a daily basis, and is a field of artificial intelligence and linguistics. For example, as a method of retrieving a desired document from a large amount of document data, a document data retrieval method using natural language processing has been conventionally performed.

"Morphological analysis" used in natural language processing is the processing of dividing a sentence or a phrase into minimum units (word) having a meaning and discriminating the part of speech, etc. Machine learning is to iteratively perform learning from data, find a pattern (feature) that lies therein, and classify the data. It becomes possible to perform a prediction by applying the learned result to the new data. In machine learning in natural language processing, a large amount of sentence information is learned, and a vector space representing a word is generated from the distribution of words that appear before and after the word.

Analysis cases of, e.g., analysis reports and application notes in the databases A and B have been stored as vectorized and characterized document data. More specifically, words, documents, sentences in a document related to a case are vectorized (dispersion-expressed) and accumulated in the space. This enables the calculation of the distance between vectors and the operation between vectors.

In the databases A and B, analysis data of samples, which were requested in the past by users, is accumulated as cases. Therefore, by deploying a search service with these cases as databases, the user can acquire a response that it is possible to widely analyze a presented sample.

Then, in Step S19, a search target that coincides with the search keyword is searched. When there is a search target in the databases A and B that coincide with the search keyword (e.g., the distance between vectors is close), the search result is sent to the user terminal 3a via the network (NW) 10 (Step S27).

On the other hand, in a case where there is no search target in the databases A and B that coincide with the search keyword, in Step S21, the presence or absence of a search target similar to the search target (e.g., the presence or absence of an analysis case of a sample similar to the sample presented by the user) is retrieved. In a case where there is an analysis case of the similar sample, a determination is made as to whether or not to analyze it in Step S23. For example, in a case where the presented sample is a compound, it is determined the presence or absence of a past analysis case about the similar compound name, the similar analysis method, and the similar analysis object, whether or not it is possible to answer an analysis method and preprocessing, etc., to be used. At this time, when the analysis case contains confidential in-house data, it is also determined whether or not analysis cases from which the in-house data has been omitted is set to a "search result".

Therefore, in a case where there is a past analysis case similar to the search target, the search result (analysis case, preprocessing, etc.) is output in Step S27 after the determination of whether or not to analyze is made in Step S23. For example, in Step S11 described above, when there is a presentation (input by a search keyword) stating "I want to analyze poisons in domestic wastewater", as a result of interpreting the meaning of the string, the analysis result about poisons that have been performed in the past on "tap water," which is a sub-concept of "water" in the search keyword, is extracted as a similar case, and the answer thereof is made. The answer to the search result may include information about the installation of the analysis device.

In Step S21, when it is determined that a search target similar to the search target is not in the databases A and B, it is determined in Step S25 that there is no case, and this is output in Step S27.

Figure 4:
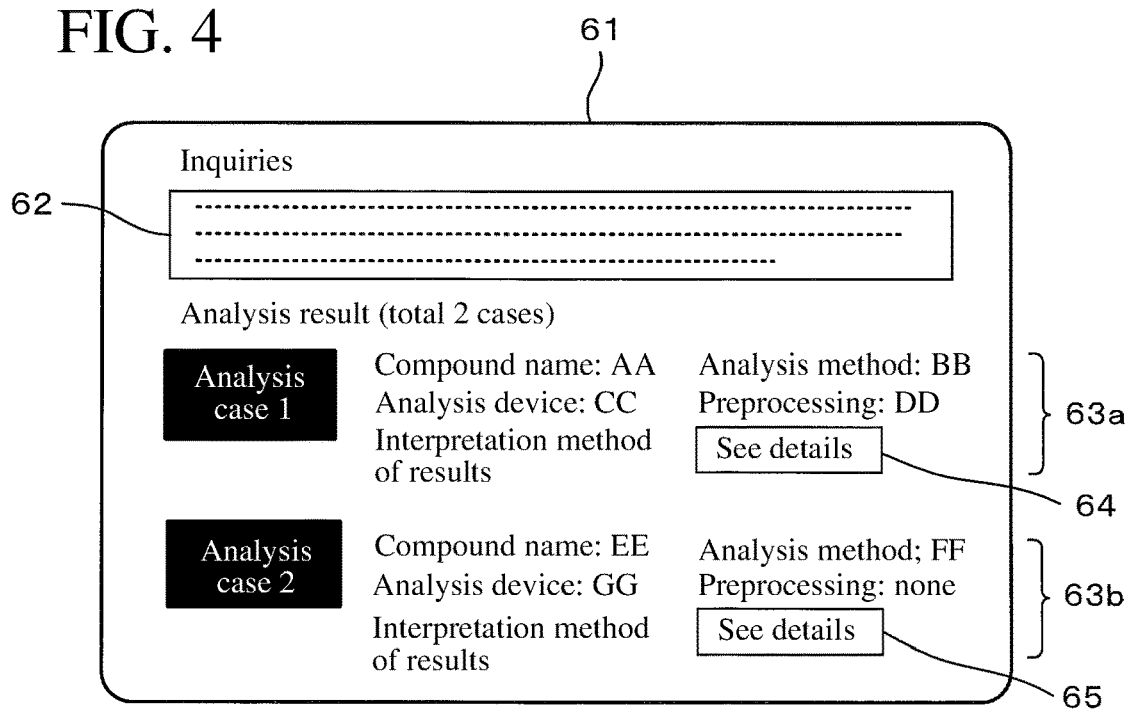
FIG. 4 is a diagram showing an example showing a search result.

FIG. 4 shows a display example of a search result. In the example of FIG. 4, the upper column 62 of the display 61 shows the query input by the user, and the lower column shows the search result. FIG. 4 shows an example of displaying two cases of search results (analysis cases).

As an analysis case, for example, a compound name, an analysis method, an analysis device, preprocessing, etc., are displayed (indicated by the reference numerals 63a and 63b), and the contents of the interpretation method of the search result are displayed on a separate screen by selecting "See details" buttons 64 and 65.

For example, in the analysis case 1, "The sample ΔΔ is composed of a compound AA and can be analyzed by the analysis method called a BB method using the analysis device CC. As the preprocessing, the preprocessing DD is effective".

As described above, according to the first embodiment, the contents of the analysis request presented by the user is semantically retrieved based on the search keyword. Thus, even in a case where the keyword of the analysis target (compound) presented by the user does not completely coincide with the compound keyword in the analysis cases in the databases, it becomes possible to answer as an analysis case by determining whether or not the analysis is possible by the analysis case of the similar compound.

As a consequence, the user can quickly and assuredly acquire an answer to a wide variety of analytical request contents, such as, e.g., detailed analysis cases of the analysis target (compound), analysis cases of similar compounds, devices required to analyze the sample held by the user, and information about the preprocessing. Further, through such a search service, it is possible to promptly receive an order without going through a distributor or a sales division.

Further, by analyzing the trends of the search keyword used in searches, it is possible to grasp the user's analytical needs, improve products, and decide the expansion policy of applications. In addition, an analysis report can be prepared based on a target object with analytical needs, and the analysis result and the measurement result can be accumulated in the form of an analysis report.

Second Embodiment

Figure 5:
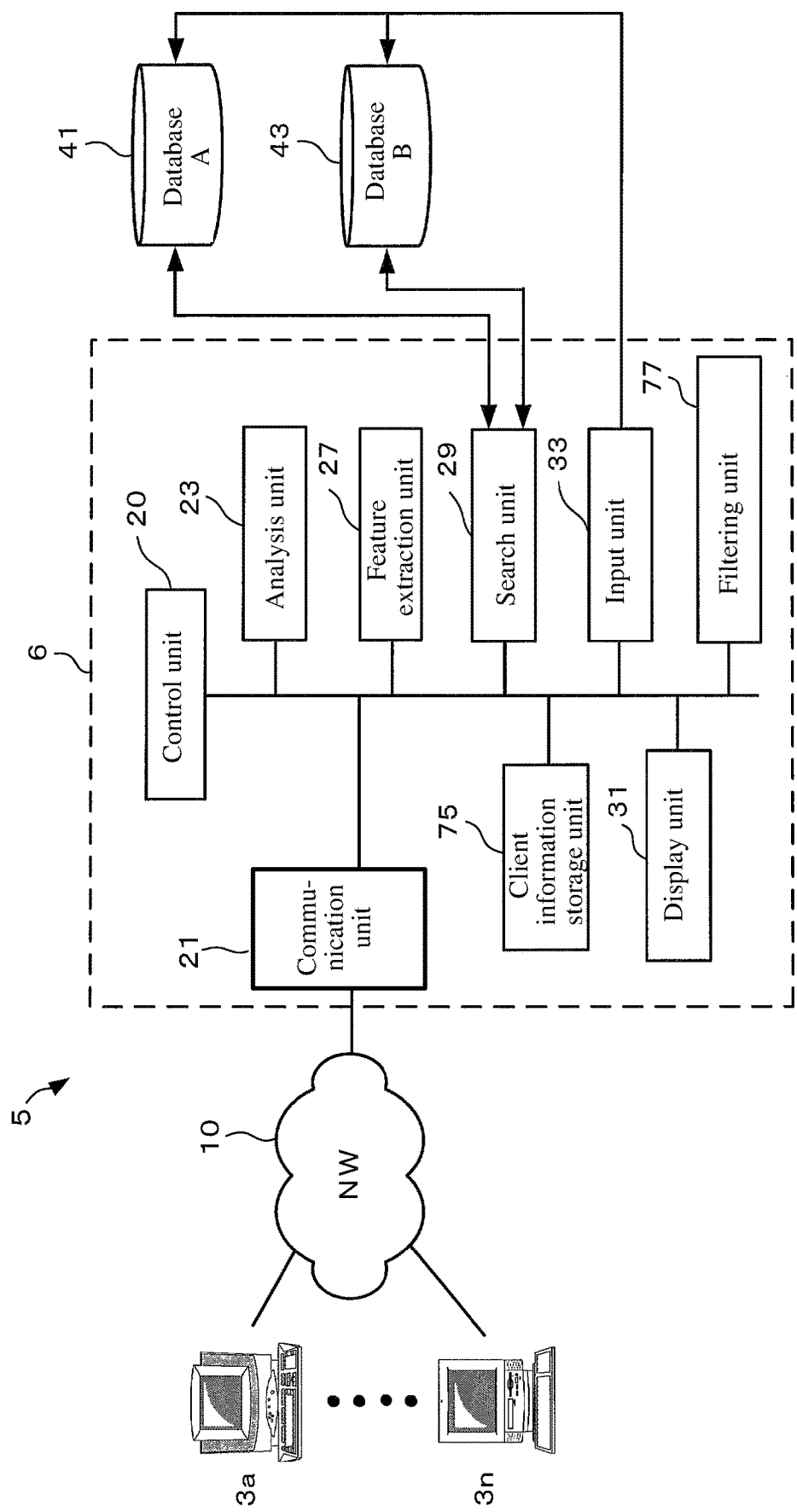
FIG. 5 is a block diagram showing an exemplary configuration of a case search system according to a second embodiment.

FIG. 5 is a block diagram showing an example of the configuration of a case search system according to a second embodiment. In FIG. 5, the same component as that of the case search system according to the first embodiment shown in FIG. 1 is denoted by the same reference numeral, and the description thereof will be omitted.

As illustrated in FIG. 5, in the case search system 5 according to the second embodiment, the server device 6 and the plurality of user terminals 3a to 3n are connected to each other so as to transmit and receive information to each other via the network (NW) 10.

The customer information storage unit 75 of the server device 6 is a corpus database and contains information (customer information) about the customer using the case search system 5 input in advance through the input unit 33. The filtering unit 77 filters the analysis case that is interpreted in the semantic content of the search string by the search unit 29 and output as the search result according to the customer information stored in the customer information storage unit 75.

The customer information includes information about, for example, an analysis device purchased and used by a customer, a parameter specific to the analysis device (e.g., the type of the inert gas, the feed rate, the feed time, the flow rate, the analysis condition of preprocessing, etc., per sample, the processing condition), the type of column to be used, the sample analyzed in the past, etc.

Next, the search processing in the case search system of the second embodiment will be described. FIG. 6 is a flowchart showing the processing procedures of acquiring a required case using the case search system according to the second embodiment. In FIG. 6, the same step as that of the search processing step in the case search system according to the first embodiment shown in FIG. 2 is denoted by the same reference numeral, and the description thereof will be omitted.

In the case search system 5 according to the second embodiment, in a case where there is no search target that coincides with the search string (search keyword) in the databases A and B in Step S21, but it is determined that there is an analysis case of the search target similar to the search target, in Step S31, whether or not to analyze by the similar analysis target object or the like is determined, and the analysis case is listed.

Here, the listed analysis cases are arranged (sorted), for example, in the order from the nearest meaning of the input search string (search keyword).

Note that, in the same manner as in the case of the first embodiment described above, as the determination of whether or not the analysis in Step S31 is possible, for example, in a case where the presented sample is a compound, it is determined the presence or absence of a past analysis case about a similar compound name, a similar analysis method, a similar analysis target object, or the like, whether or not an analysis device to be used, preprocessing, or the like, can be answered. Also in this instance, in a case where the analysis case contains confidential in-house data, it is determined whether or not the analysis case with the in-house data omitted is set to a search result.

In Step S33, for a search target determined to coincide with the search string in Step S19, or for a similar search target in which there is a search case for the search target similar to the search target in Step S31, determined to be answerable for the analysis and listed, the filtering processing corresponding to the customer information stored in the customer information storage unit 75 or the processing for rearranging the order of the analysis cases, is performed.

For example, in a case where a search keyword is input by a customer to analyze and measure pesticide residues contained in a food, such as, e.g., a crop, as the analysis device, a wide variety of analysis devices can be used. The analysis devices include, for example, a liquid chromatograph equipment (LC), a gas chromatograph (GC), a gas chromatograph mass spectrometer (GC-MS), a liquid chromatograph mass spectrometer (LC-MS), a photodiode array detector (LC-PDA), a liquid chromatography tandem mass spectrometer (LC/MS/MS), a gas chromatography tandem mass spectrometer (GC/MS/MS), and a liquid chromatograph mass spectrometer (LC/MS-IT-TOF).

In a case where the customer has a gas chromatograph device (GC), the case search system 5 performs filtering processing on the search target or the similar search target depending on the customer information, i.e., the equipment specifications of the GC of the customer, preprocessing as the parameter specific to the GC, the type of the inert gas, the feed rate, the feed time, the type of the column used in the GC, the sample that analyzed residual pesticides, etc., in the past.

Consequently, in Step S35, the analysis case of pesticide residues is output as the search result, and the customer can obtain a report of the analysis case and the analysis result with higher accuracy according to the analysis device of its own, the past analysis case, the preprocessing, and the like.

Note that in Step S21, when it is determined that the search target similar to the search target is not in the databases A and B, it is determined in Step S25 that there is no case, and the determination is output in Step S35.

As described above, according to the second embodiment, the content of the analysis request from the customer is semantically retrieved based on the search keyword. Even in a case where the keyword of the analysis target presented by the customer does not coincide with the keyword of the analysis case in the database, it is possible to answer the analysis case of the similar compound and also possible to answer the analysis case and the analysis result with high accuracy according to the analysis device owned by the customer, the past analysis cases, etc., by applying filtering processing according to the customer information to the listed analysis case.

DESCRIPTION OF SYMBOLS 1, 5: Case search system
2, 6: Server device
3a to 3n: User terminal
10: Network (NW)
20: Control unit
23: Analysis unit
25: User information storage unit
27: Feature extraction unit
29: Search unit
31: Display unit
33: Input unit
41: Database A
43: Database B
51: Login screen
61: Display
75: Customer information storage unit
77: Filtering unit

The invention claimed is:

1. A search method comprising the steps of:
receiving a search string input by a user, the search string including an indication of a chemical compound;
forming a vector characterizing the search string input;
interpreting, based on the vector, a semantic content contained in the search string;
retrieving, based on a result of the step of interpreting, a first analytical report from a database where a group of analytical reports are stored, each of the analytical reports including information regarding a type of an analyzer used in the analytical report, and an analytical result obtained through an experiment for the chemical compound or a second compound which is identified to have a characteristic similar to the chemical compound;
extracting the information from the first analytical report; and
displaying, on a display, a part of the retrieved first analytical report as well as the information separately.

2. The search method as recited in claim 1, wherein the step of interpreting performs a semantic search on the received search string.

3. The search method as recited in claim 1, wherein the base is composed of a set of a word vector, a sentence vector, and a document vector relating to an analytical report.

4. The search method as recited in claim 3, wherein the step of retrieving compares a feature vector acquired by morphologically analyzing the search string with a word vector, a sentence vector, and a document vector in the database within a multidimensional space.

5. The search method as recited in claim 1, wherein any information about preprocessing, an analyzer, and an installation of the analyzer, which is mentioned in a document, is retrieved in the retrieval step, and
the any information and the analytical report are displayed in the outputting step.

6. The search method as recited in claim 1, further comprising the step of:
newly accumulating an analytical report differing from a past analytical report among the retrieved analytical reports in the database.

7. The search method as recited in claim 1, wherein the step of retrieving retrieves at least one analytical report of a compound name or a similar compound name, an analysis method or a similar analysis method, an analysis target object or a similar analysis target object contained in the search string.

8. The search method as recited in claim 1, further comprising the steps of:
analyzing a predetermined tendency indicated by the received search string, based on the step of interpreting; and
outputting a result of the analysis.

9. The search method as recited in claim 1, wherein the step of retrieving includes retrieving the analytical report of the second compound similar to and different from the chemical compound.

10. The search method as recited in claim 1, wherein the first analytical report is prestored in the database before the search string input by the user is received.

11. A search system comprising:
a database configured to accumulate an analytical report; and
a server device configured to,
receive a search string input by a user, the search string including an indication of a chemical compound;
form a vector characterizing the search string input and, based on the vector, interpret a semantic content contained in the received search string;
retrieve, based on a result of the interpretation, a first analytical report from the database where a group of analytical reports are stored, each of the analytical reports including information regarding a type of an analyzer used in the analytical report, and an analytical result obtained through an experiment for the chemical compound or a second compound which is identified to have a characteristic similar to the chemical compound;

extract the information from the first analytical report; and display, on a display, a part of the retrieved the first analytical report as well as the information separately.

12. The search system as recited in claim 11, further comprising:

a user terminal connected via a communication line.

13. A search method comprising the steps of:

receiving a search string input by a user, the search string including an indication of a chemical compound;

forming a vector characterizing the search string input;

interpreting, based on the vector, a semantic content contained in the search string;

retrieving, based on a result of the step of interpreting, a first analytical report from a database where a group of analytical reports are stored, each of the analytical reports including information regarding a type of an analyzer used in the analytical report, and an analytical result obtained through an experiment for the chemical compound or a second compound which is identified to have a characteristic similar to the chemical compound;

extracting the information from the first analytical report;

performing predetermined filtering processing corresponding to customer information acquired in advance with respect to the retrieved analytical report; and displaying, on a display, a part of the retrieved first analytical report as well as the information separately after the filtering processing.

14. The search method as recited in claim 13, wherein the customer information includes at least an analyzer owned by a customer, a parameter unique to the analyzer, and a past analytical report.

15. The search method as recited in claim 13, wherein the step of interpreting performs a semantic search with respect to the received search string.

16. The search method as recited in claim 13, wherein the database is a corpus database composed of a set of a word vector, a sentence vector, and a document vector relating to an analytical report.

17. The search method as recited in claim 16, wherein the step of retrieving compares a feature vector acquired by morphologically analyzing the search string with a word vector, a sentence vector, and a document vector in the corpus database within a multidimensional space.

\* \* \* \* \*